United States Patent
Stauter et al.

(10) Patent No.: US 8,291,721 B2
(45) Date of Patent: Oct. 23, 2012

(54) DUAL CONDENSER FANS WITH CENTER PARTITION

(75) Inventors: Richie C. Stauter, Fayetteville, NY (US); Peter R. Bushnell, Cazenovia, NY (US); Stephen Stopyra, Syracuse, NY (US); Donald B. Hotaling, Jamesville, NY (US); Jason A. Gough, Marcellus, NY (US)

(73) Assignee: Carrier Corporation, Farmington, CT (US)

( * ) Notice: Subject to any disclaimer, the term of this patent is extended or adjusted under 35 U.S.C. 154(b) by 671 days.

(21) Appl. No.: 12/391,691

(22) Filed: Feb. 24, 2009

(65) Prior Publication Data

US 2009/0211286 A1 Aug. 27, 2009

Related U.S. Application Data

(60) Provisional application No. 61/031,150, filed on Feb. 25, 2008.

(51) Int. Cl.
*B60H 1/32* (2006.01)
*F25D 17/06* (2006.01)
*F25B 39/04* (2006.01)

(52) U.S. Cl. ............... 62/239; 62/428; 62/429; 62/506; 62/507

(58) Field of Classification Search ............ 62/239, 62/429, 296
See application file for complete search history.

(56) References Cited

U.S. PATENT DOCUMENTS

| | | | | |
|---|---|---|---|---|
| 2,391,151 A | * | 12/1945 | Lowell | 62/325 |
| 2,391,859 A | * | 1/1946 | Babcock | 62/93 |
| 3,731,056 A | * | 5/1973 | Becker | 392/350 |
| 4,979,584 A | * | 12/1990 | Charles | 180/68.1 |
| 5,002,905 A | * | 3/1991 | Boecker et al. | 501/88 |
| 5,649,587 A | | 7/1997 | Plant | |
| 5,660,149 A | | 8/1997 | Lakerdas et al. | |
| 6,223,546 B1 | * | 5/2001 | Chopko et al. | 62/243 |
| 6,491,502 B2 | * | 12/2002 | Hunt | 417/360 |
| 6,494,052 B1 | * | 12/2002 | Lee | 62/244 |
| 6,684,937 B2 | | 2/2004 | Lenz et al. | |
| 2007/0031257 A1 | * | 2/2007 | Suzuki et al. | 416/182 |
| 2009/0113914 A1 | * | 5/2009 | Kitano et al. | 62/239 |
| 2011/0114286 A1 | * | 5/2011 | Komatsu et al. | 165/51 |

FOREIGN PATENT DOCUMENTS

WO WO 2007135948 A1 * 11/2007

OTHER PUBLICATIONS

"Refrigeration Unit for Trailer." Espacenet. Nov. 29, 2007. Web. <http://worldwide.espacenet.com/publicationDetails/description?CC=WO&NR=2007135948A1&KC=A1&FT=D&ND=11&date=20071129&DB=EPODOC&locale=en_EP>.*

* cited by examiner

*Primary Examiner* — Cheryl J Tyler
*Assistant Examiner* — Ignacio E Landeros
(74) *Attorney, Agent, or Firm* — Cantor Colburn LLP

(57) ABSTRACT

A transport refrigeration system having a structural framework supporting a refrigeration unit including a condenser heat exchanger supported in an upper region of the framework and an engine and an electric generator powered by the engine supported by the framework in an engine compartment in a lower region of the framework, includes a pair of vertically disposed condenser fan/motor assemblies disposed aft of the condenser heat exchanger in side-by-side relationship and above the engine compartment; and a flow partition extending vertically between the pair of condenser fan/motor assemblies.

5 Claims, 5 Drawing Sheets

DUAL CONDENSER FANS WITH CENTER PARTITION

CROSS-REFERENCE TO RELATED APPLICATIONS

This application claims the benefit of and priority from U.S. Provisional Patent Application Ser. No. 61/031,150, filed Feb. 25, 2008, and entitled: Dual Condenser Fans With Center Partition.

This application is related to the following application subject to the common assignee of this application and filed with the United States patent and Trademark Office on the same date as this application: U.S. patent application Ser. No. 12/391,737, entitled "Modular Condenser Fan Assembly".

FIELD OF THE INVENTION

This invention relates generally to transport refrigeration systems and, more particularly, to an improvement in cooling an onboard engine with air having traversed the refrigeration unit condenser.

BACKGROUND OF THE INVENTION

Transport refrigeration systems are commonly employed in connection with refrigerated transport trailers used in shipping perishable goods. The transport trailer is adapted to be connected to and towed by a truck tractor. The transport refrigeration system includes a refrigeration unit, an electric generator assembly and an engine for driving the electric generator, all supported on a framework structural support configured to be mounted to the front wall of the trailer.

In transport refrigeration systems, the refrigeration unit includes a condenser heat exchanger through which refrigerant is passed in heat exchange with ambient air as a cooling medium for condensing refrigerant from a vapor phase into a liquid phase. One or more, condenser fans are provided to draw the ambient air through the condenser heat exchanger. Typically, a pair of condenser fans are provided, disposed in a side-by-side arrangement.

In some transportation refrigeration system designs, such as for example the Vector 1800 transport refrigeration unit manufactured by Carrier Corporation, Farmington, Conn., U.S.A., a pair of condenser axial flow fans, disposed horizontally in side by side relationship, are mounted to the framework of the refrigeration system beneath and aft of the condenser heat exchanger and above the engine compartment wherein a diesel powered engine and electric generator driven by the engine are disposed. So configured, these axial flow fans direct substantially all of the air discharging from the condenser downwardly into and through the engine compartment to assist in the cooling the engine and generator. This air then exits through the bottom of the unit into the surrounding environment. However, this fan arrangement, coupled with the fact that substantially all of the condenser air exits through the bottom of the unit, can generate a relatively high level of noise.

SUMMARY OF THE INVENTION

A transport refrigeration system has a structural framework supporting a refrigeration unit including a condenser heat exchanger supported in an upper region of the framework and an engine and an electric generator powered by the engine supported by the framework in an engine compartment in a lower region of the framework. A pair of vertically disposed condenser fan/motor assemblies are disposed aft of the condenser heat exchanger in side-by-side relationship and above the engine compartment. A flow partition is disposed between the pair of vertically disposed condenser fans on the discharge side of the fans for separating the respective air flows discharging from the condenser fans and directing a limited portion of the respective air flows downwardly into the engine compartment therebeneath for cooling the components therein. The flow partition may comprise a vertically elongated partition having a lower region of extending downwardly beyond a lower extent of the respective condenser fans of the condenser fan/motor assemblies. The transport refrigeration system may include an evaporator housing disposed supported in the framework aft of the condenser fan/motor assemblies, and the flow partition may extend from between the pair of condenser fan/motor assemblies aftwardly to the evaporator housing.

In an embodiment, each condenser fan/motor assembly comprises a motor and an impeller, the motor having an outer casing having a rotatable portion, the impeller being rotatable with the rotatable portion of the outer casing of the motor. In an embodiment, the impeller has an inner shroud, an outer shroud disposed in spaced relationship and circumscribing the inner shroud, and a plurality of blades extending between the inner shroud and the outer shroud, the inner shroud disposed about and rotatable with the rotatable portion of the outer casing of the motor.

DETAILED DESCRIPTION OF THE INVENTION

Figure 1:
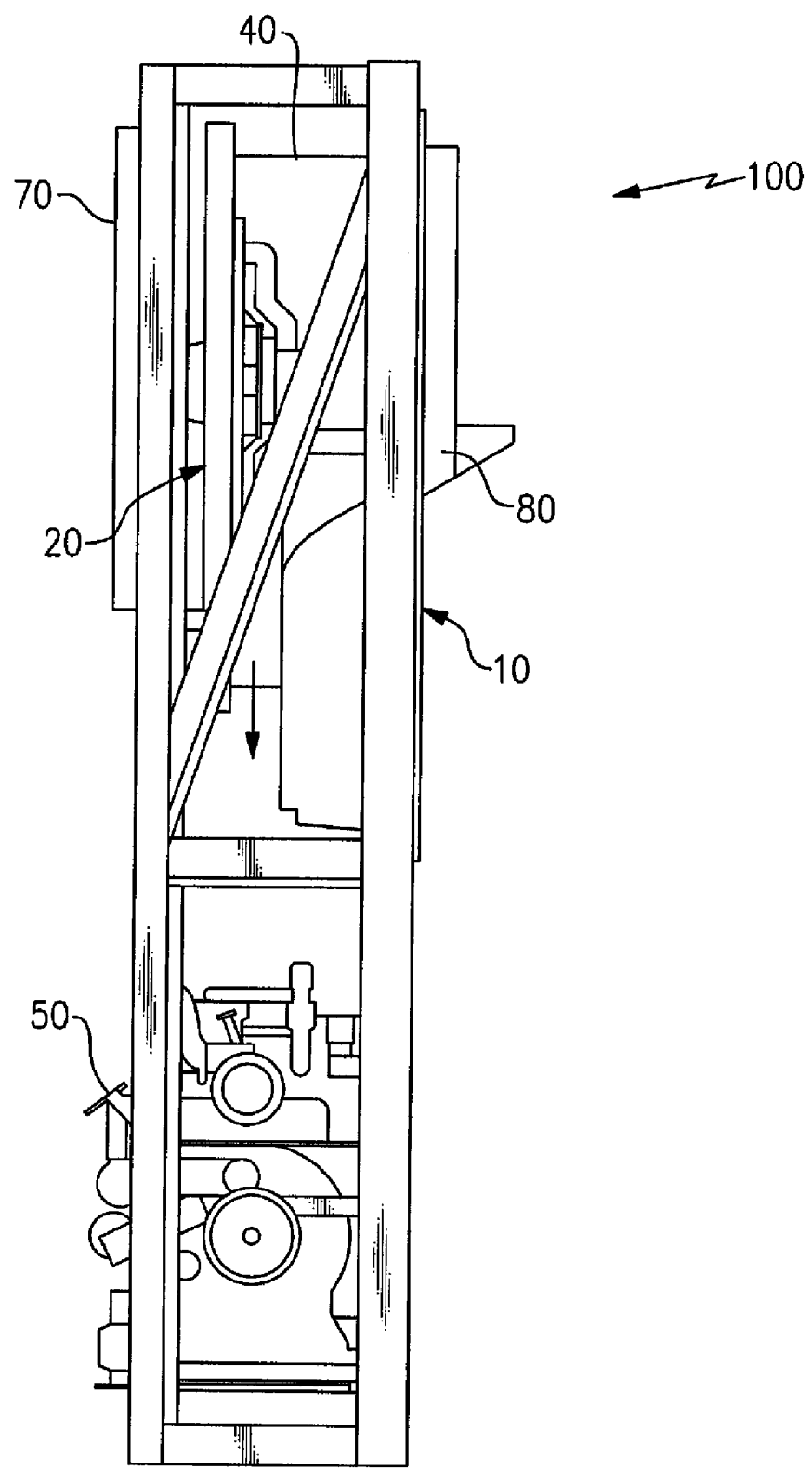
FIG. 1 is a side elevation view of a partially assembled transport refrigeration system.
Figure 2:
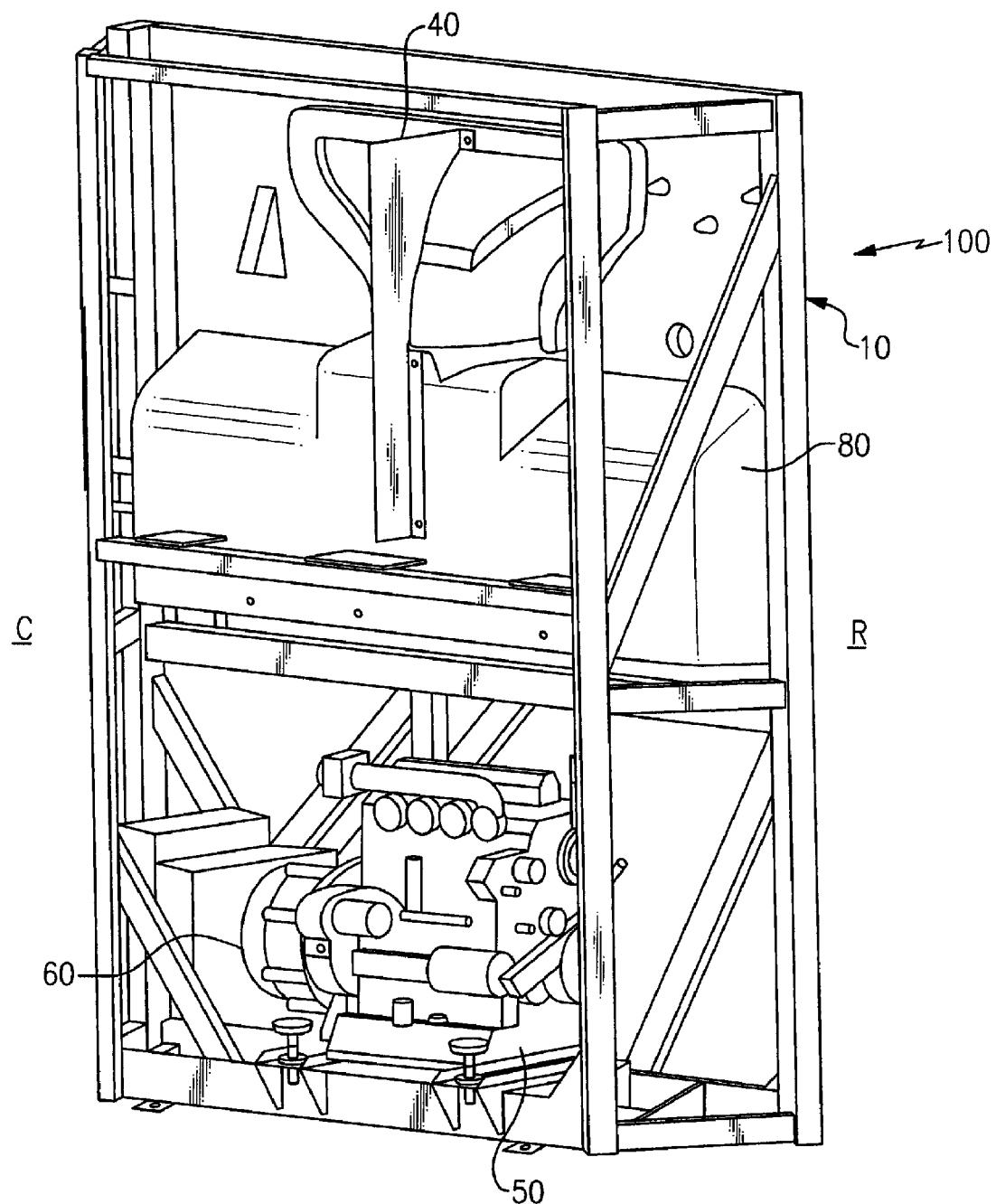
FIG. 2 is a front elevation view, in perspective, of the partially assembled transport refrigeration system of FIG. 1 with the condenser heat exchanger and condenser fan assemblies removed.
Figure 3:
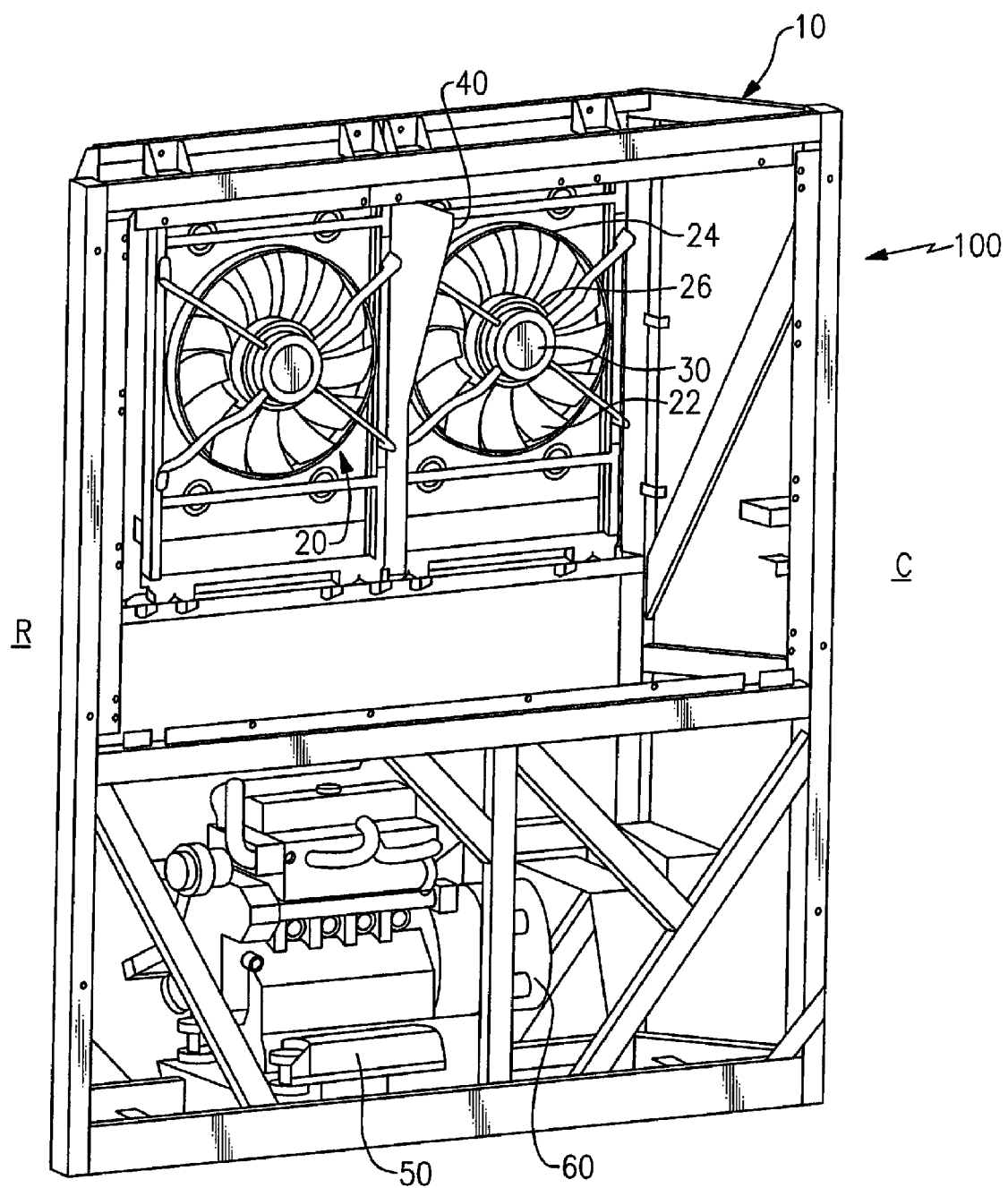
FIG. 3 is a rear elevation view, in perspective, of the partially assembled transport refrigeration system of FIG. 1 with the evaporator housing removed.
Figure 4:
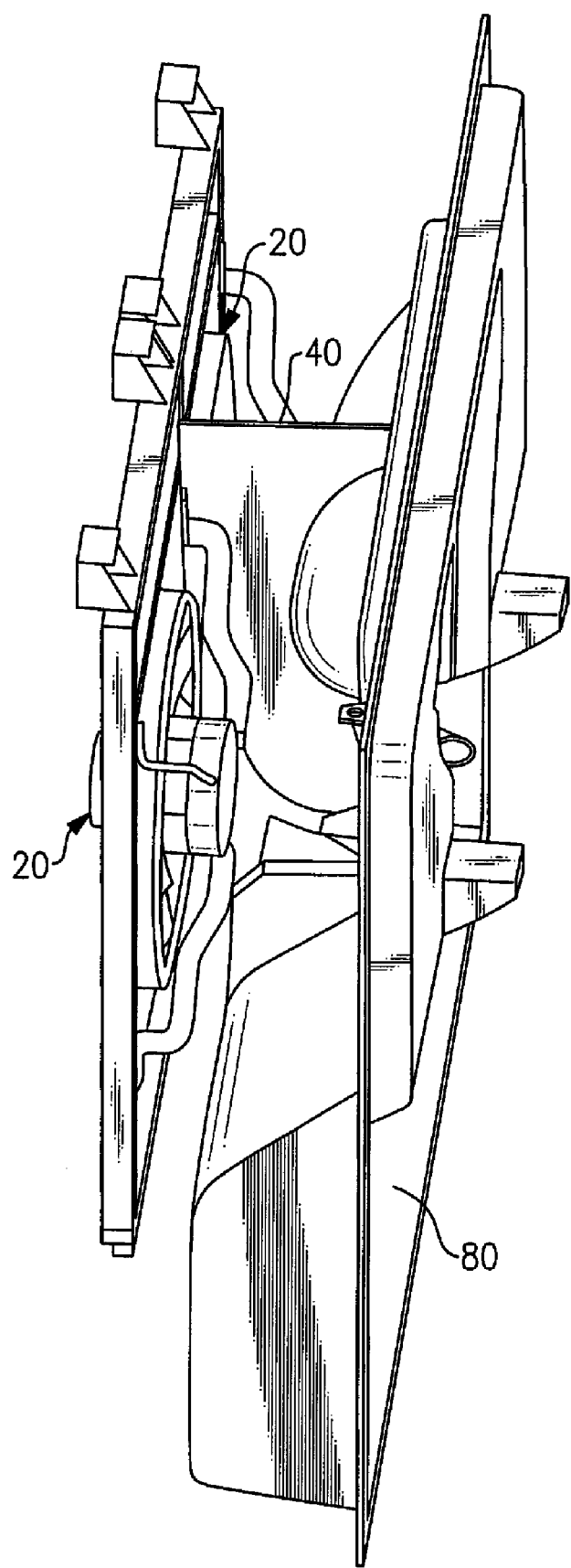
FIG. 4 is a side elevation view, in perspective, of the region of FIG. 1 showing the partition disposed between the pair of condenser fan/motor assemblies.

Referring now to FIGS. 1-4, in particular, the transport refrigeration system 100 includes a structural framework, designated generally at 10, that forms a skeletal structure from which various components of the transport refrigeration unit are supported, as well as an electric generator 60 and a diesel powered engine 50 are supported. As in conventional practice, the diesel powered engine 50 drives the electric generator 60 that produces and supplies electrical power to a compressor motor (not shown) that drives the compressor (not shown) of the refrigeration unit, the evaporator fan motor (not shown) of the refrigeration unit, and the drive motors associated with the condenser fan/motor assemblies 20, as well as any other electrically powered equipment associated with the transport refrigeration system.

The condenser fan/motor assemblies 20 are positioned within the structural framework 10 of the transport refrigeration system at the forward side thereof aft of the condenser 70 and forward of the evaporator housing 80 and is positioned above the diesel powered engine 50 and electric generator 60 driven by the engine. Each of the condenser fan motor assemblies 20 includes an axial flow impeller 22 and a drive motor 30 operatively associated therewith. With the condenser fan/motor assemblies 20 positioned vertically, the air discharging from the condenser fan/motor assemblies 20 swirls naturally about a horizontal axis towards the evaporator housing 80. However, the evaporator housing 80 presents a barrier to further progression of the air flow, resulting in the major portion of the air flow discharging from the condenser fan/motor assemblies 20 passing generally upwardly to exit to the atmosphere through the top of transport refrigeration unit.

A partition 40 having vertical and horizontal expanse is disposed between the condenser fan/motor assemblies 20. In the exemplary embodiment depicted in the drawing, the partition 40 is disposed centrally between the condenser fan/motor assemblies 20 and extends longitudinally vertically downwardly toward the engine compartment therebeneath and extends transversely outwardly to meet the evaporator housing 80. Thus, the partition 40 forms a physical flow barrier which separates the respective air flows discharging from the condenser fan/motor assemblies 20 thereby eliminating local communication and consequent cancellation of the natural swirl in the air flows discharging from the axial flow impellers 22. As a result a portion of the discharging air in each of the respective air flows swirls downwardly toward the engine compartment therebeneath. When these downwardly swirling air flows pass beyond the lower extent of the partition 40, the air flows combine to produce a vortical air flow that flows downwardly into the engine compartment on the curb side, C, of the unit and thence upwardly on the on the road side, R, of the unit to exit to the atmosphere through the top of the refrigeration unit. In traversing the engine compartment, the air flow cools the generator 60 and assists in cooling the engine 50. A relatively small fraction of the air flow traversing the engine compartment may exit to the atmosphere through the bottom of the unit.

The cooling of the engine compartment is enhanced by the presence of the vertical partition 40 separating the respective air flows discharging from the side by side condenser fan/motor assemblies 20. For example, tests showed that engine compartment temperatures averaged from about 12 degrees F. to about 18 degrees F. cooler, depending upon location within the engine compartment, when the vertical partition 40 was installed versus when the vertical partition 40 was not present.

In an embodiment, each condenser fan/motor assembly 20 includes an axial flow impeller 22 that is disposed about an associated fan motor 30, which may be a so-called "inside/out" type motor as illustrated in the depicted embodiment. In an "inside/out" motor, the shaft of the motor is the motor stator and the outer casing, or a portion of the outer casing, is the motor rotor. The impeller 22 has a plurality of blades and an outer shroud 24 and an inner shroud 26. The inner shroud 26 is disposed about a central portion of the outer casing of the motor 30 so as to rotate with the central portion of the outer casing, which as noted before forms the motor rotor. The motor 30 is supplied with electrical power through a cord (not shown) which connects to a power supply box (not shown) that receives electrical power from an onboard electric generator 60 powered by a diesel engine 50. It is to be understood, however, that other configurations of fan and motor assembly may also be used in combination with the partition 40.

Figure 5:
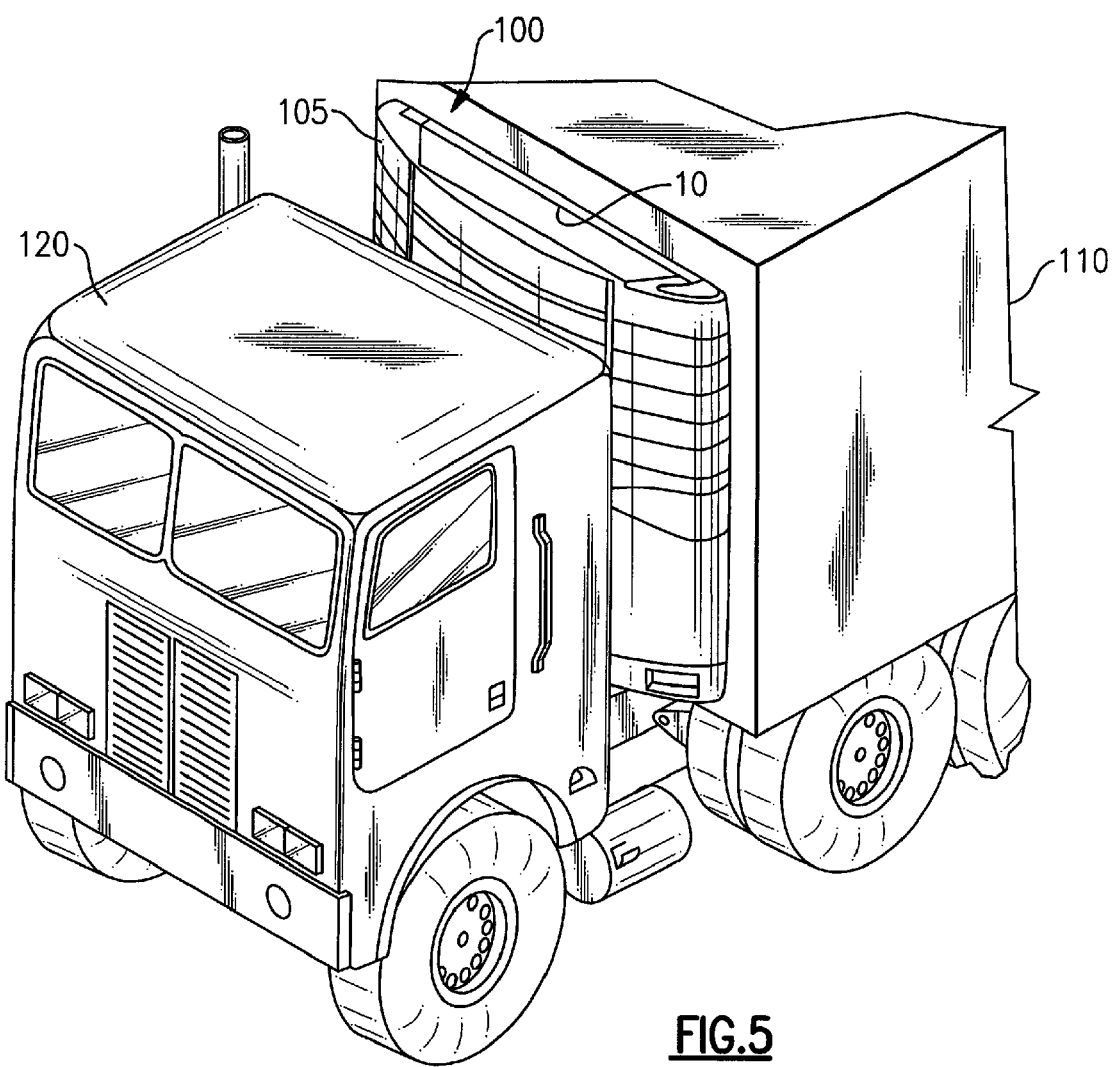
FIG. 5 is a perspective view illustrating a transport refrigeration system mounted to the front wall of the trailer of a truck and trailer unit.

Referring now also to FIG. 5, there is illustrated a transport refrigeration system 100 mounted to the front wall of a refrigerated trailer 110 pulled by a tractor 120. As is common for transport refrigeration systems, an outer cover 105, itself supported on the structural framework 10, covers the framework 10 and all of the components of the refrigeration unit, including but limited to a compressor (not shown), an evaporator and associated evaporator fan/motor assembly (not shown) disposed within the confines of the evaporator housing 80, the condenser heat exchanger 70 and the condenser fan/motor assemblies 20, as well as the engine 50 and the electric generator 60 driven by the engine 50.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

Therefore, it is intended that the present disclosure not be limited to the particular embodiment(s) disclosed as, but that the disclosure will include all embodiments falling within the scope of the appended claims.

What is claimed is:

1. A transport refrigeration system having a structural framework for supporting a refrigeration unit including a condenser heat exchanger, an evaporator housing, and a pair of condenser fan assemblies supported in an upper region of the framework and an engine and an electric generator powered by the engine supported by the framework in an engine compartment in a lower region of the framework, comprising:

each of said pair of condenser fan assemblies comprises a motor and an impeller, the pair of condenser fan assemblies configured for directing ambient air flow from the condenser heat exchanger into the structural framework, the pair of condenser fan assemblies being positioned in a side by side relationship horizontally along a width of the structural framework and located above the engine compartment, the pair of condenser fan assemblies being disposed aft of the condenser heat exchanger and forward of an evaporator housing;

a flow partition configured for separating the ambient air flow from each condenser fan assembly of the pair of condenser fan assemblies and communicating the separated ambient air flow into the engine compartment in the lower region, the flow partition extending longitudinally along a length of the upper region and extending transversely from between each of said condenser fan assembly impellers to a surface of the evaporator housing.

2. The transportation system as recited in claim 1 wherein the motor having an outer casing having a rotatable portion, the impeller being rotatable with the rotatable portion of the outer casing of the motor.

3. The transport refrigeration system as recited in claim 2 wherein the impeller has an inner shroud, an outer shroud disposed in spaced relationship and circumscribing the inner shroud, and a plurality of blades extending between the inner shroud and the outer shroud, the inner shroud disposed about and rotatable with the rotatable portion of the outer casing of the motor.

4. The transport refrigeration system as recited in claim 1 wherein the flow partition is configured for eliminating local communication of the ambient air flow from the each condenser fan within the upper region.

5. The transport refrigeration system as recited in claim 1 wherein a lower portion of the partition extends downwardly beyond a lower extent of the each condenser fan assembly.

* * * * *